No. 775,757. PATENTED NOV. 22, 1904.
H. D. LORIA.
FRICTION CLUTCH OR COUPLING.
APPLICATION FILED JUNE 24, 1903.
NO MODEL.
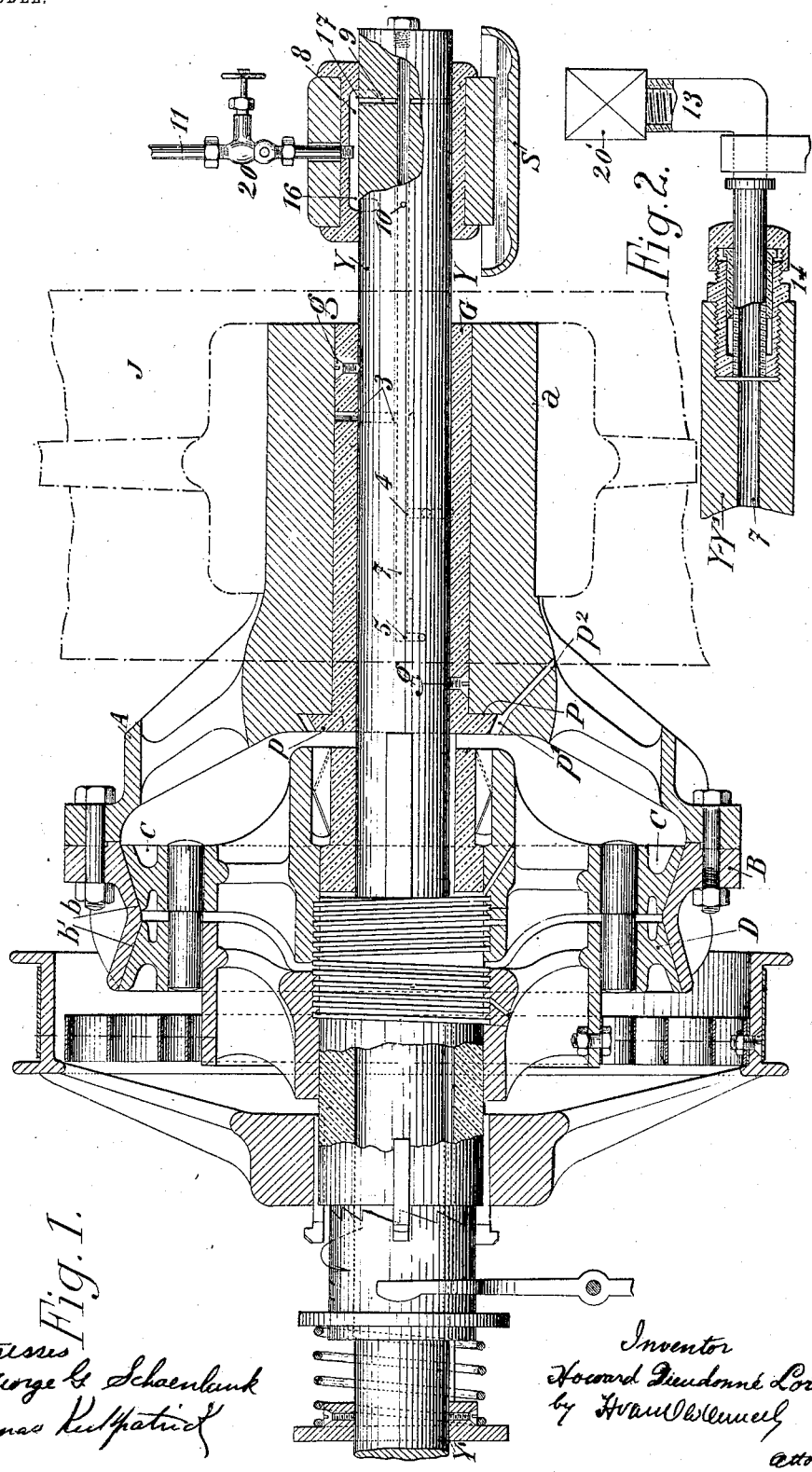

No. 775,757.   Patented November 22, 1904.

UNITED STATES PATENT OFFICE.

HOWARD DIEUDONNÉ LORIA, OF ORCHAMPS, FRANCE.

FRICTION CLUTCH OR COUPLING.

SPECIFICATION forming part of Letters Patent No. 775,757, dated November 22, 1904.

Application filed June 24, 1903. Serial No. 162,956. (No model.)

*To all whom it may concern:*

Be it known that I, HOWARD DIEUDONNÉ LORIA, a citizen of the French Republic, residing at Orchamps, Jura, in the Republic of France, have invented certain new and useful Improvements in Friction Clutches or Couplings, of which the following is a specification.

This invention relates to lubricating arrangements for use, for instance, with friction clutches or couplings; and it consists in the features and combination and arrangement of parts hereinafter described, and particularly pointed out in the claim.

In the accompanying drawings, Figure 1 is a vertical longitudinal section of a clutch with my invention applied thereto, and Fig. 2 is a detail view of a modification of a part relating to my invention.

The clutch with which my invention is shown applied comprises a disk A on a shaft Y Y', arranged to rotate freely thereon and having a boss $a$ rigidly secured to the driving element J, (indicated in dotted lines.) The disk A carries an annulus B, having conical bearing-faces $b\ b'$, coöperating with two cones C D, which may be moved toward and from each other in any suitable manner so as to contact with or be removed from contacting with the conical bearing-faces $b\ b'$.

Lubrication of the surface of the boss $a$ where exposed to friction is assured as follows: A central axial orifice 7 through the right-hand end of the shaft Y Y' communicates, by means of radiating oil-holes 3, 4, and 5, with the internal surface of the boss $a$. When the element J rotates without carrying in its rotation the shaft Y Y', oil is forced along the orifice 7 and passing through the oil-holes 3, 4, and 5 reaches the boss $a$. To prevent this oil from passing to the conical bearing-faces $b\ b'$, the seat P of the boss $a$, against which abuts the head $p$ of the bush G, is of conical or frustum-shaped formation and the annular space $p'$ so formed constitutes a chamber for reception of the oil, with which communicate oil-holes $p^2$, formed obliquely in the boss $a$ and whereby the oil is forced outward by centrifugal action.

In Fig. 1 is shown an arrangement whereby the flow of oil in the orifice 7 can be regulated. A bearing-bracket S supports the shaft Y Y', and at the upper end of the said bracket is an oil-chamber 8, whose sides 16 and 17 extend about ninety degrees across the upper surface of the shaft Y Y', which they cover. Two diametrical holes 9 and 10 pass through the said shaft perpendicular to each other, so that one of the two holes 9 and 10 always leads into the oil-chamber 8. Oil is supplied to the bracket by means of a tube 11 with a cock 20. When the shaft Y Y' is not rotating and the boss $a$ rotates, the oil passing from one or other of the oil-holes 9 and 10 through the orifice 7 and holes 3, 4, and 5 lubricates the bearing of the said boss $a$; but when the shaft Y Y' rotates with the boss $a$ centrifugal force prevents the oil from passing through the holes 9 10, so that the lubrication of the boss $a$ ceases, while the lubrication of the shaft in the bracket S is assured in the ordinary way. This arrangement is especially suitable when the shaft Y Y' is to be coupled to a shaft forming an extension or continuation thereof, because the oil cannot be made to pass into the orifice 7 through the extremity of the shaft Y Y'; but when the shaft terminates near the clutch there may be employed the arrangement shown in Fig. 2. In this case the oil is supplied from a drip-lubricator 20' to a fixed bent tube 13, connected to the end of the shaft Y Y' by a gland 14. In this case the lubricator 20' is only operated when the boss $a$ turns alone and the shaft Y Y' remains stationary. The bush G is held to the shaft by screws $g$.

Having now described my invention, what I claim, and desire to secure by Letters Patent, is—

In a clutch, the combination with the shaft of a boss thereon having conical friction or bearing surfaces in connection therewith, a bush G within the boss and about which the boss rotates said boss having a conical recess at one end and the bush having a conical or frustum-shaped formation fitting in the said recess, means for lubricating the bearing between the bush and the boss, and a conduit leading from the said recess for the discharge of oil outward.

In witness whereof I have hereunto set my hand in presence of two witnesses.

HOWARD DIEUDONNÉ LORIA.

Witnesses:
EMMANUEL A. ADLER,
JEAN BAPTISTE VANTELOT.